United States Patent
Huinink et al.

[11] Patent Number: 6,070,632
[45] Date of Patent: Jun. 6, 2000

[54] COMPLETE VEHICLE WHEEL ASSEMBLY

[75] Inventors: Heinrich Huinink, Garbsen; Horst Sergel; Roland Knopp, both of Hannover, all of Germany

[73] Assignee: Continental Aktiengesellschaft, Germany

[21] Appl. No.: 09/056,552

[22] Filed: Apr. 7, 1998

[30] Foreign Application Priority Data

Apr. 7, 1997 [DE] Germany .......................... 197 14 200

[51] Int. Cl.[7] .................................................. B60C 15/02
[52] U.S. Cl. ................................ 152/379.5; 152/DIG. 20; 152/380; 152/544
[58] Field of Search ................................. 152/375, 379.3, 152/379.4, 379.5, 380, 381.4, 386, DIG. 20, 544

[56] References Cited

U.S. PATENT DOCUMENTS

| | | | |
|---|---|---|---|
| 1,903,575 | 4/1933 | Shoemaker | 152/DIG. 20 |
| 1,932,191 | 10/1933 | Shoemaker | 152/DIG. 20 |
| 4,623,009 | 11/1986 | Seitz et al. | 152/DIG. 20 |
| 5,082,040 | 1/1992 | Spitz | 152/DIG. 20 |

FOREIGN PATENT DOCUMENTS

| | | |
|---|---|---|
| 2327026 | 12/1973 | Germany .......................... 152/379.3 |
| 2937272 | 3/1980 | Germany . |
| 3605803 | 1/1987 | Germany . |
| 3601185 | 7/1987 | Germany . |
| 3732590 | 4/1989 | Germany . |
| 3733515 | 4/1989 | Germany . |
| 3809425 | 10/1989 | Germany . |

*Primary Examiner*—Russell D. Stormer
*Attorney, Agent, or Firm*—Robert W. Becker & Associates

[57] ABSTRACT

A complete vehicle wheel assembly includes a wheel with wheel rim having two opposed circular rim flanges and a tire having beads secured at the circular rim flanges. Each one of the circular rim flanges has a tubular hollow chamber with an annular opening. The tubular hollow chamber has a square or rectangular cross-section, and the annular opening has a width such that the bead is insertable into the tubular hollow chamber only in a rotated or deformed state after insertion of the bead, a remaining free space in the tubular hollow chamber is filled with a liquid, hardenable material.

8 Claims, 4 Drawing Sheets

COMPLETE VEHICLE WHEEL ASSEMBLY

BACKGROUND OF THE INVENTION

The present invention relates to a complete vehicle wheel assembly comprising a specially designed wheel with wheel rim and a specially designed tire having beads. The present invention also relates to a method for manufacturing the afordescribed complete vehicle wheel assembly.

Tires are disposable articles because due to wear of the tire tread only a limited service life is provided.

Conventionally, the wheel and the tire are separate entities which can be bought individually.

For mounting a new tire on a wheel rim of a wheel, it is required to first demount the worn tire, position the new tire, fill it with air, balance the tire/wheel and to mount the tire/wheel assembly on the vehicle. These different steps are manually performed as individual services. Performing the afordescribed steps in an automated fashion or making the process more economical by reducing the number of steps is not possible. Furthermore, mounting the tire requires skilled labor, and also special tools. Balancing of the tire/wheel assembly requires a corresponding balancing machine and an operator having the necessary skills for operating such a balancing machine. Because of the aforementioned reasons, the mounting of new tires is expensive with respect to labor costs and, on the other hand, these working steps cannot be performed by a technically inexperienced driver in a do it yourself fashion.

Since wheels can be produced relatively inexpensively as a mass-produced article, and since it must be expected that the labor for the manual mounting and balancing of tires will increase steadily, it is to be expected, when taking into consideration mass production in countries having a low wage, that, when comparing manual mounting costs with the costs for a complete tire/wheel assembly, the break-even point has already been reached or will soon be surpassed.

Also, there is no contradiction, between a long service life tire and the inventively integrated tire/wheel assembly. Only with respect to expensive luxury cars, classic cars, and vehicles with expensive aluminum wheels, manual mounting of the tires will still be used in the future.

When the tires of a vehicle are worn, in the future the driver will purchase a complete tire/wheel assembly at a supermarket in order to subsequently mount the tire/wheel assembly himself on the vehicle in the same manner as a spare tire or special tires for winter driving conditions. This will become so common place in the future as is today self service refueling of the vehicle.

Different wheel tire arrangements are known from the prior art in which the beads of the tire are fastened in laterally arranged grooves at the outer circumference of the wheel.

From German Offenlegungsschrift 26 37 272 such an pneumatic tire/wheel assembly is known in which the pneumatic tire is secured at the wheel rim such that the beads arranged at the tire sidewalls engage corresponding bead seats at the wheel. The bead seats at the wheel rim are circumferentially extending grooves which have a narrow opening for receiving the ends of the tire flanks. The wheel rims are comprised of two parts that can be secured at one another by screws in order to form the upper and lower portion of the receiving opening. When assembled, the width of the opening is narrower than the bead thickness of the tire so that the bead is safely prevented from slipping out of the wheel rim.

From German Offenlegungsschrift 36 05 803 a vehicle wheel assembly comprising of wheel rim and a pneumatic vehicle tire is known whereby the tire beads are positioned in laterally arranged grooves at the wheel rim. Fastening of the tire at the wheel rim is performed by applying a clamping ring.

German Offenlegungsschrift documents 37 32 590, 37 33 515, and 38 09 425 describe an arrangement comprised of a pneumatic vehicle tire and a wheel in which the wheel rim also comprises lateral annular grooves for receiving the tire beads and in which fastening of the beads inserted into the grooves is realized by compressing the upper and lower portions defining the opening of the groove.

According to German Offenlegungsschrift 36 01 185 the two beads of a pneumatic vehicle tire are embedded in lateral annular grooves of the wheel rim. Here the openings are again more narrow than the widest cross-section of the bead. The tire beads are threaded into the narrow opening of the groove by rotation or by deformation. A special tire/wheel fastening is not provided.

It is therefore an object of the present invention to provide an inexpensive complete wheel assembly comprised of a pneumatic vehicle tire and a wheel.

SUMMARY OF THE INVENTION

A complete vehicle wheel assembly according to the present invention is primarily characterized by:

a wheel with a wheel rim having two opposed circular rim flanges;

a tire having beads secured at the circular rim flanges;

each one of the circular rim flanges having a tubular hollow chamber with an annular opening, wherein the tubular hollow chamber has a square or rectangular cross-section and the annular opening has a width such that the bead is insertable into the tubular hollow chamber only a in rotated or deformed state, wherein after insertion of the bead a remaining free space in the tubular hollow chamber is filled with a liquid, hardenable material.

Preferably, the liquid, hardenable material is an epoxy resin, a liquid plastic material, or a metal having a low melting point.

Each one of the rim flanges has preferably a radially outwardly positioned, raised support as an emergency running surface.

In an alternative embodiment, the wheel rim has two opposed rim flanges and the tire has beads secured at the circular rim flanges. Each one of the circular rim flanges has a tubular hollow chamber with an annular opening wherein the tubular hollow chamber has a square or rectangular cross-section. Each one of the beads has a hollow bead space. After insertion of the beads into the tubular hollow chamber, a liquid, hardenable material is injected under pressure into the hollow bead space to completely fill the hollow bead space such that the tubular hollow chamber is completely filled by the bead.

The liquid, hardenable material is preferably an epoxy resin, a liquid plastic material or a metal having a low melting point.

Each one of the rim flanges has a radially outwardly positioned, raised support as an emergency running surface.

The present invention also relates to a method for producing a complete vehicle wheel assembly comprising a wheel with a wheel rim having two opposed circular rim flanges and a tire having beads secured a the circular rim flanges, wherein the method comprises the steps of:

providing each bead with a wide and a narrow side;
providing each rim flange with a tubular hollow chamber with an annular opening;
rotating the bead such that the narrow side faces the annular opening and is insertable into the tubular hollow chamber;
filling a remaining free space in the tubular hollow chamber with a liquid, hardenable material;
adjusting the position of the bead in the tubular hollow chamber for optimizing trueness of the tire and the wheel;
allowing the liquid, hardenable material to harden.

The present invention also relates to another method for producing a complete vehicle wheel assembly comprising a wheel with a wheel rim having two opposed circular rim flanges and a tire having beads secured at the circular rim flanges. The method comprises steps of:
providing each bead with a wide and a narrow side and with a hollow bead space;
providing each rim flange with a tubular hollow chamber with an annular opening;
rotating the bead such that the narrow side faces the annular opening and is insertable into the tubular hollow chamber;
injecting a liquid, hardenable material under pressure into the hollow bead space to completely fill the hollow bead space such that the tubular hollow chamber is completely filled by the bead;
adjusting the position of the bead in the tubular hollow chamber for optimizing trueness of the tire and the wheel rim;
allowing the liquid, hardenable material to harden.

According to the present invention, a tire and a wheel having a special wheel rim are connected to one another by injection molding in a non-detachable manner. This requires a special wheel rim geometry and a correspondingly matched tire construction.

The fixed (non-detachable) connection of the tire and the wheel ensures in comparison to conventionally mounted tires an improved emergency running operation.

By eliminating the drop base of the wheel rim, an enlarged constructive space for brakes and suspension parts is provided. Furthermore, when eliminating the steel core, further weight reduction is possible, and a considerable material saving is realized also. Since the amount of rubber to be deformed during driving is reduced, there is also a reduction of the rolling resistance. Losing the tire is not possible because the tire and the wheel rim are fixedly and securely attached to one another. The inventively integrated wheel opens many possibilities in regard to design variations.

According to a preferred embodiment of the invention, a raised support is provided in order to further optimize the emergency running operation.

Furthermore, the possibility of optimizing the tire uniformity or trueness is provided. The trueness of the tire is measured before the final attachment. According to this data, the bead within the hollow chamber can be moved in the axial direction by small travel strokes so that the deviations from trueness can be compensated.

The inventive tire and wheel assembly can be advantageously used also with vehicles employing an air suspension system.

Retreading of the complete wheel assembly is carried out such that the wheel is introduced into a heated vulcanization mold for heat-induced vulcanization or such that cold vulcanization is performed with a respective adhesive compound.

Recycling is not very difficult. First, the wheel and tire are separated from one another mechanically by cutting or milling. The remaining parts (steel wheel or aluminum wheel) are then transferred to a material recycling process. Also, a renewed use is possible. The remaining parts can be recycled by thermal processes or as a granular material.

BRIEF DESCRIPTION OF THE DRAWINGS

The present invention will now be described in detail with the aid of several specific embodiments utilizing the accompanying drawings. It is shown in.

DESCRIPTION OF PREFERRED EMBODIMENTS

Figure 1:
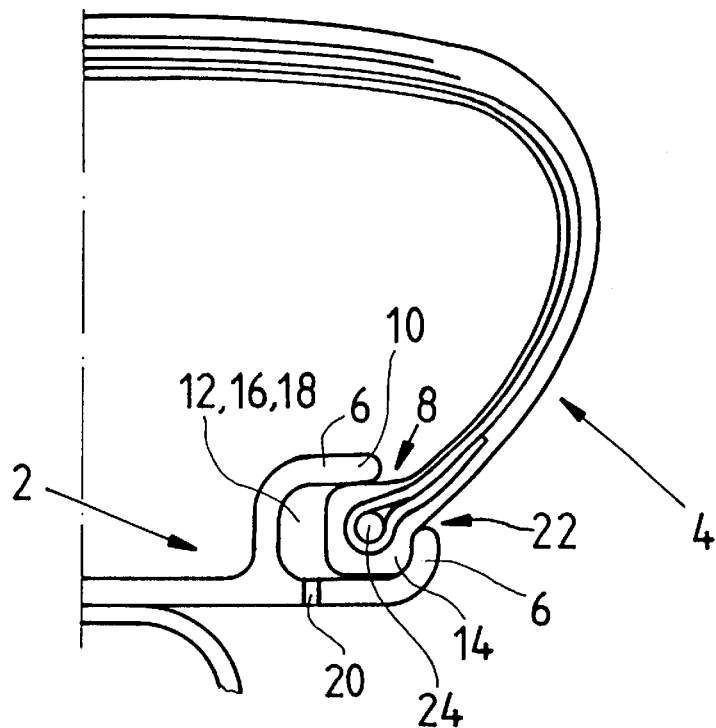
FIGS. 1, 2 different embodiments of the inventive wheel/tire assembly.

FIG. 1 shows an embodiment A of the inventive wheel/tire assembly comprising a speciality wheel with wheel rim 2 and a special tire 4. Conventional tires cannot be used because their bead area is designed differently. The wheel rim 2 has on either side a circular rim flange 6 having a tubular hollow chamber 12 with a laterally extending annular opening 8. Preferably, the cross-section of the tubular hollow chamber 12 within the rim flange 6 is rectangular or square with rounded corners. The radially outwardly positioned side of the tubular wheel rim flange 6 provides an emergency running surface 10. The upper or lower outer corner of the tubular hollow chamber 12 is missing i.e., it provides the aforementioned annular opening 8. The width of this opening 8 is such that the bead 14 of the tire 4 can be inserted only after rotation into the annular hollow chamber 12. After insertion of the bead 14 into the hollow chamber 12, the previously rotated bead 14 is elastically returned into its initial position and closes off the opening 8 of the hollow chamber 12 with its wide side.

In order to ensure that the bead 14 cannot rotate out of the annular hollow chamber 12 and in order to ensure a secure non-detachable seat of the bead 14 within the hollow chamber 12, the remaining free space of the hollow chamber 12 is filled with liquid, hardenable material. For this purpose, the wheel rim flange 6 has a fill bore 20 at a suitable location. Alternatively, filling from the exterior (22) can be performed also.

Figure 3A:
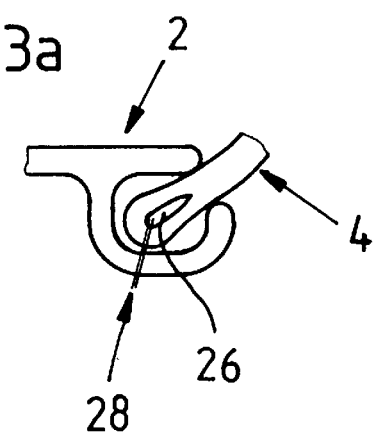
FIGS. 3a, 3b an alternative manufacturing process of the inventive non-detachable wheel/tire assembly.
Figure 3B:
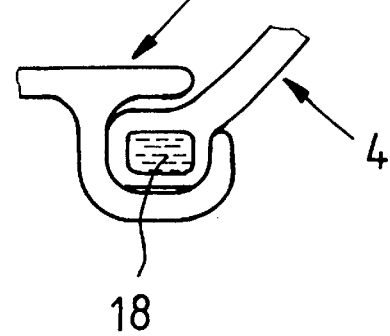
Figure 4:
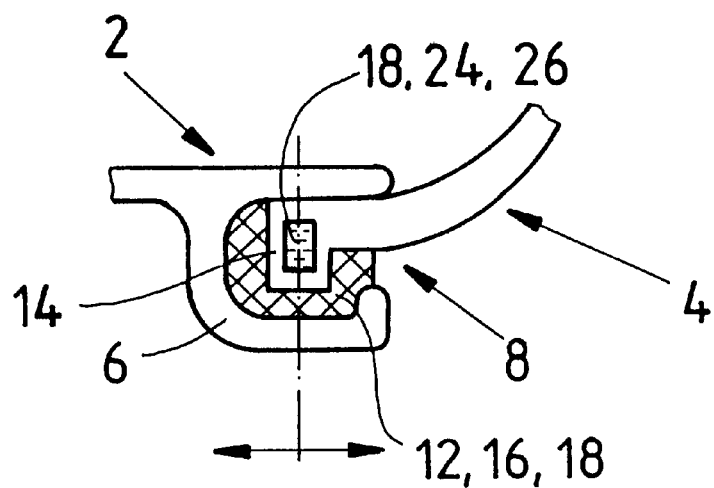
FIG. 4 the possibility of displacement of the bead in order to optimize trueness.

The embodiments represented in FIGS. 3a and 3b provide an alternative possibility for securing the bead 14 within the hollow chamber 12 of the wheel flange. Instead of filling the free space 16, shown in FIG. 1, with a liquid, hardenable material 18, a hollow space 26 provided within the center of the bead 14 is filled under pressure, after insertion of the bead 14 into the hollow chamber 12, with a liquid, hardenable material 18 through injection port 28 to such an extent that the bead 14 fills the entire hollow chamber 12 of the wheel rim 6 so that a secure seating of the tire 4 on the wheel rim 2 is ensured.

The representations of FIGS. 5 through 11 of wheel/tire combinations are further variations of the inventive concept. In comparison to the wheel rims represented in FIGS. 1 and 2, the position and thus the function of the filling material is different in those of FIGS. 5 through 11. The filling material reduces the cross-section of the open side of the hollow chamber and prevents thus the loosening or slipping out of the bead from the hollow chamber.

Figure 2:
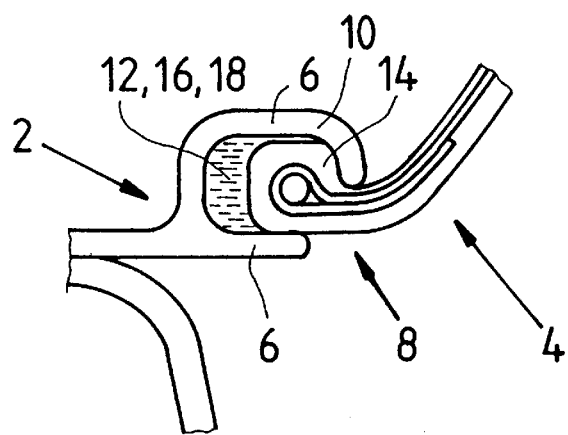
Figure 5:
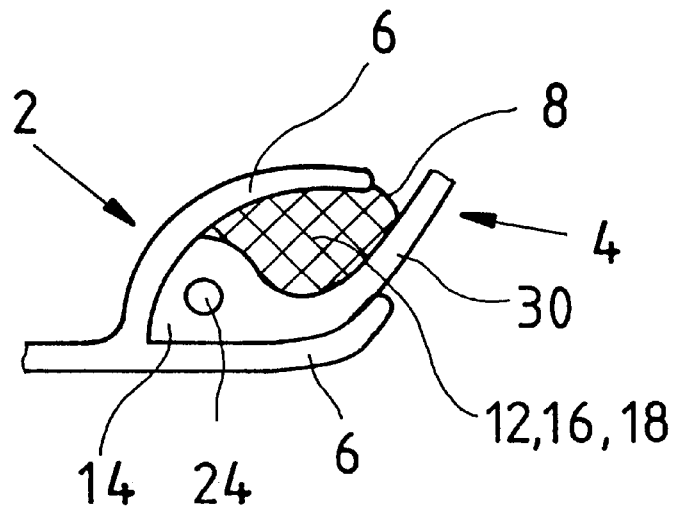
FIGS. 5–11 different variations of the inventive wheel/tire assembly.
Figure 6:
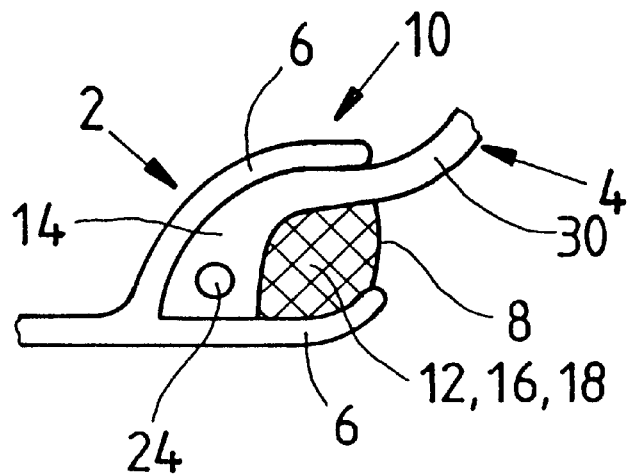
Figure 7:
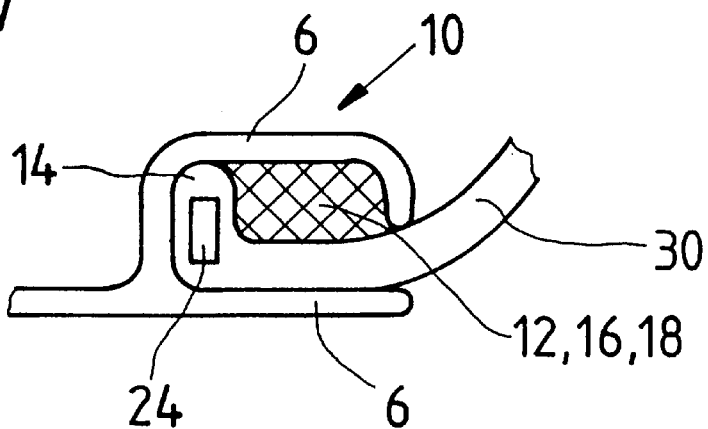
Figure 8:
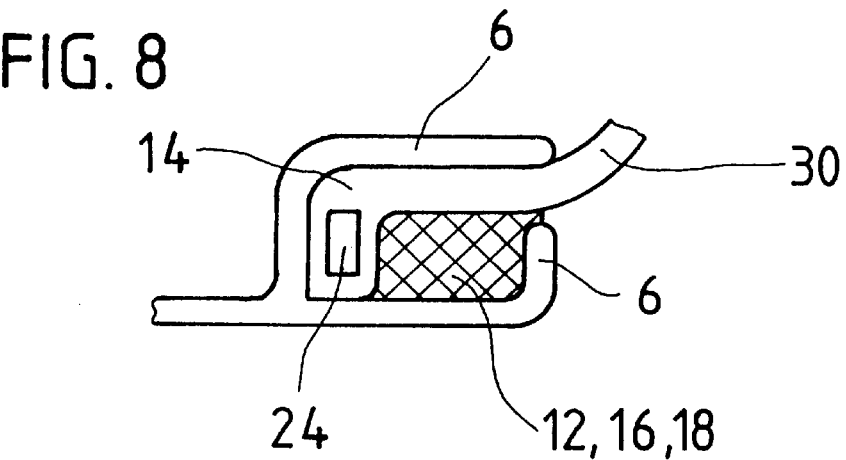

FIGS. 2, 5, and 7 show embodiments which, based on the design of the tubular wheel rim flange and of the tire bead, have an increased emergency running potential without additional support structure.

Figure 9:
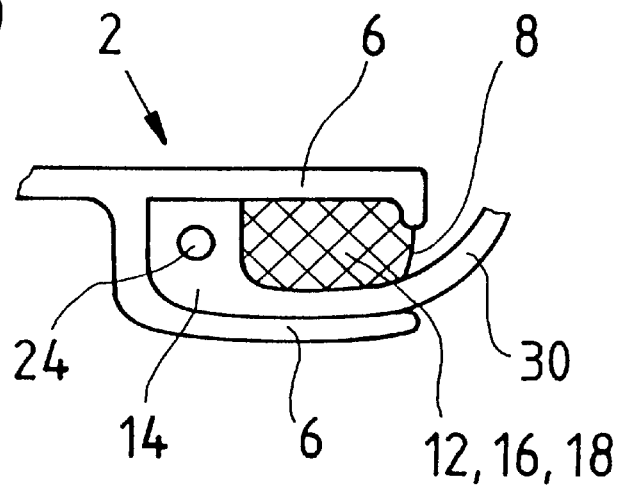
Figure 10:
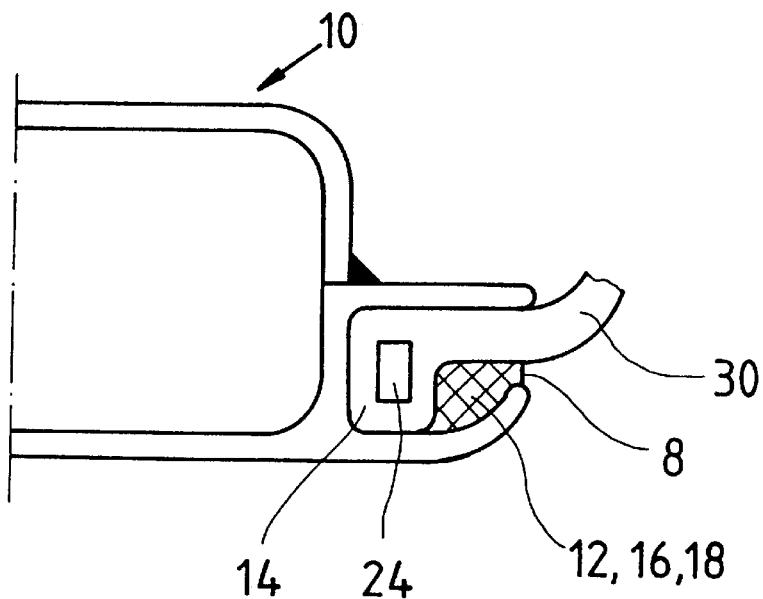
Figure 11:
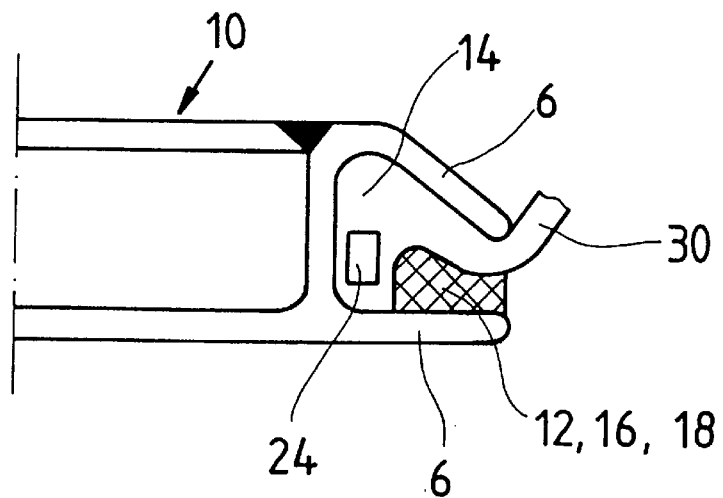
Figure 12:
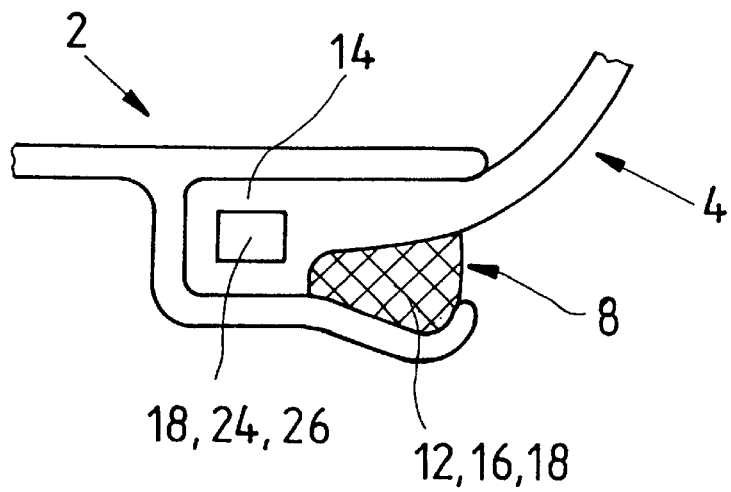
FIG. 12 an embodiment in which mounting of the tire is possible without rotation or deformation of the bead.

With the exception of FIG. 9, the represented embodiments do not require the bead 14 to be rotated in order to be introduced into the hollow chamber 12 of the wheel rim flange 6. Instead, the flank (sidewall) 30 of the tire is slightly bent so that the transversely embodied bead 14 can be inserted longitudinally through the opening 8 into the hollow chamber 12 of the wheel rim flange 6. The cross-sections of the bead 14 and the opening width of the wheel rim flange 6 are designed such that a bending of the tire flank 30 to the inner or outer side allows for a facilitated insertion of the bead 14 into the hollow chamber 12. In all shown embodiments, the cross-section of the hollow chamber 12 and the cross-section of the bead 14 must be embodied such that the bead 14 has a contact length with the inner surface of the hollow chamber 12 that is as large as possible. Thus, a substantially defined position of the tire 4 with respect to the wheel rim 2 is provided. The remaining free space 16 is filled with a hardenable material.

In the embodiment represented in FIG. 9, the arrow shows the direction of filling.

The manufacture of the disclosed complete wheel assembly is inventively carried out as follows.

The transversely extending bead 14 is rotated in the longitudinal direction. The thus rotated bead 14 is inserted into the annular opening 8 of the tubular hollow chamber 12 where, because of the elastic pretension, it will assume its original transverse position. The remaining free space 16 within the hollow chamber 12 of the wheel rim 6 is filled with liquid, hardenable material 18, for example, epoxy resin or liquid plastic material or liquid metal. Until the introduced material 18 has hardened, the position of the bead 14 within the hollow chamber 12 can be changed in the direction of circumference of the wheel rim for he purpose of optimizing trueness of the wheel.

According to an alternative embodiment of the invention, the fixation of the tire 4 at the wheel rim 2 is not performed by filling the remaining free space 16. Instead, the inventively provided bead core hollow space 26 is filled by injection 28 with a liquid, hardenable material 18, for example, epoxy resin, high-modular polymer, thermoplastic material, or a metal having a low melting point such that the bead 14 completely fills the hollow chamber 12 and no free space 16 remains.

The specification incorporates by reference the disclosure of German priority document 197 14 200.1 of Apr. 7, 1997.

The present invention is, of course, in no way restricted to the specific disclosure of the specification and drawings, but also encompasses any modifications within the scope of the appended claims.

What is claimed is:

1. A complete vehicle wheel assembly comprising:
   a wheel with a wheel rim having two opposed circular rim flanges;
   a tire having beads secured at said circular rim flanges;
   each one of said circular rim flanges having annular wall surfaces defining a tubular hollow chamber with an annular opening, wherein said tubular hollow chamber has a square or rectangular cross-section and said annular opening has a width narrower than a widest cross-section of said bead such that said bead is insertable into said tubular hollow chamber only in a rotated or deformed state, wherein, after insertion of said bead, said bead has an initial, substantially defined and secured position relative to said wheel rim, wherein said bead has a first surface, resting against a first portion of said annular wall surfaces, and a second surface facing the interior of said hollow tubular chamber, wherein a second portion of said annular wall surfaces not covered by said bead and said second surface of said bead facing the interior define a free space in said tubular hollow chamber and wherein said free space is filled with a liquid, hardenable material to finally fix said bead inside said hollow tubular chamber.

2. A complete vehicle wheel assembly according to claim 1, wherein said liquid hardenable material is an epoxy resin, a liquid plastic material, or a metal having a low melting point.

3. A complete vehicle wheel assembly according to claim 1, wherein each one said rim flanges has a radially outwardly positioned, raised support as an emergency running surface.

4. A complete vehicle wheel assembly comprising:
   a wheel with a wheel rim having two opposed circular rim flanges;
   a tire having beads secured at said circular rim flanges;
   each one of said circular rim flanges having a tubular hollow chamber with an annular opening, wherein said tubular hollow chamber has a square or rectangular cross-section;
   each one of said beads having a hollow bead space;
   wherein, after insertion of said bead into said tubular hollow chamber, a liquid, hardenable material is injected under pressure into said hollow bead space to completely fill said hollow bead space such that said tubular hollow chamber is completely filled by said bead.

5. A complete vehicle wheel assembly according to claim 4, wherein said liquid hardenable material is an epoxy resin, a liquid plastic material, or a metal having a low melting point.

6. A complete vehicle wheel assembly according to claim 4, wherein each one said rim flanges has a radially outwardly positioned, raised support as an emergency running surface.

7. A method for producing a complete vehicle wheel assembly comprising a wheel with a wheel rim having two opposed circular rim flanges and a tire having beads 14 secured at said circular rim flanges; said method comprising the steps of:
   providing each bead with a wide and a narrow side;
   providing each rim flange with a tubular hollow chamber with an annular opening;
   rotating the bead such that the narrow side faces the annular opening and is insertable into said tubular hollow chamber;
   filling a remaining free space in said tubular hollow chamber with a liquid, hardenable material;
   adjusting the position of the bead in the tubular hollow chamber for optimizing trueness of the tire and the wheel;
   allowing the liquid, hardenable material to harden.

8. A method for producing a complete vehicle wheel assembly comprising a wheel rim having two opposed circular rim flanges and a tire having beads secured at said circular rim flanges; said method comprising the steps of:

provide each bead with a wide and a narrow side and with a hollow bead space;

providing each rim flange with a tubular hollow chamber with an annular opening;

rotating the bead such that the narrow side faces the annular opening and is insertable into said tubular hollow chamber;

injecting a liquid, hardenable material under pressure into the hollow bead space to completely fill the hollow bead space such that said tubular hollow chamber is completely filled by said bead;

adjusting the position of the bead in the tubular hollow chamber for optimizing trueness of the tire and the wheel rim;

allowing the liquid, hardenable material to harden.

* * * * *

UNITED STATES PATENT AND TRADEMARK OFFICE
CERTIFICATE OF CORRECTION

PATENT NO. : 6,070,632
DATED : June 6, 2000
INVENTOR(S) : Heinrich Huinink, Horst Sergel, and Roland Knopp It is certified that error appears in the above-identified patent and that said Letters Patent is hereby corrected as shown below:

<u>Title Page,</u>
Item [30] should read as follows:
[30] Foreign Application Priority Data
Apr. 7, 1997 [DE] Germany........194 14 200

Signed and Sealed this

Seventeenth Day of July, 2001

*Attest:*

NICHOLAS P. GODICI
*Attesting Officer    Acting Director of the United States Patent and Trademark Office*